(12) United States Patent
Byun et al.

(10) Patent No.: US 7,372,694 B2
(45) Date of Patent: May 13, 2008

(54) MOUNTING PAD FOR DISK DRIVE

(75) Inventors: Yong-kyu Byun, Yongin-si (KR); Min-pyo Hong, Suwon-si (KR); Jeong-seok Koh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 10/854,248

(22) Filed: May 27, 2004

(65) Prior Publication Data
US 2005/0007733 A1     Jan. 13, 2005

(30) Foreign Application Priority Data
Jul. 11, 2003     (KR) ...................... 10-2003-0047414

(51) Int. Cl.
*H05K 5/00*     (2006.01)
(52) U.S. Cl. .................................. 361/685; 360/97.02
(58) Field of Classification Search ................ 361/685; 360/97.02
See application file for complete search history.

(56) References Cited

U.S. PATENT DOCUMENTS

| | | | | |
|---|---|---|---|---|
| 5,235,482 A | | 8/1993 | Schmitz | |
| 5,671,103 A | * | 9/1997 | Tada | ........................ 360/97.01 |
| 5,761,184 A | * | 6/1998 | Dauber et al. | ............... 720/694 |
| 5,781,373 A | * | 7/1998 | Larson et al. | ............. 360/97.02 |
| 5,965,249 A | * | 10/1999 | Sutton et al. | ............. 428/304.4 |
| 6,473,263 B2 | * | 10/2002 | Jang et al. | ................ 360/97.01 |
| 6,496,362 B2 | * | 12/2002 | Osterhout et al. | ........... 361/685 |
| 6,567,237 B2 | * | 5/2003 | Iwahara et al. | ............. 360/97.02 |
| 6,646,826 B1 | * | 11/2003 | Haidari et al. | ............ 360/97.02 |
| 6,898,051 B2 | * | 5/2005 | Bahirat et al. | ............ 360/99.08 |
| 2004/0150948 A1 | * | 8/2004 | Tang | ........................... 361/685 |

\* cited by examiner

*Primary Examiner*—Jayprakash Gandhi
*Assistant Examiner*—Ingrid Wright
(74) *Attorney, Agent, or Firm*—Sughrue Mion, PLLC

(57) ABSTRACT

A mounting pad for a disk drive is provided. The mounting pad includes a sealing layer, which is formed on one surface of the disk drive so that a gap between a base and a cover of the disk drive can be sealed; an adhesive layer, which is formed on a surface of the electronic system facing the disk drive; and a vibration attenuation layer, which is interposed between the sealing layer and the adhesive layer to attenuate physical shocks and/or vibrations applied to the disk drive from the outside. Accordingly, it is possible to install the disk drive in the electronic system more firmly, attenuate physical shocks and vibrations applied to the disk drive from the outside, and seal a gap between the base and the cover of the disk drive.

13 Claims, 5 Drawing Sheets

MOUNTING PAD FOR DISK DRIVE

This application claims the priority of Korean Patent Application No. 2003-47414, filed on Jul. 11, 2003, in the Korean Intellectual Property Office, the disclosure of which is incorporated herein in its entirety by reference.

BACKGROUND OF THE INVENTION

1. Field of the Invention

An apparatus consistent with the present invention relates to a mounting pad for a disk drive and, more particularly, to a mounting pad for a disk drive that is capable of installing the disk drive in an electronic system, attenuating external vibrations, and sealing the disk drive.

2. Description of the Related Art

A disk drive, which is one type of data storage device, reproduces data from a disk or records data to a disk. In a hard disk drive (HDD), a read/write head mounted with an actuator records data on or reproduces data from a recording surface of a disk, which is rotating. The read/write head moves to any desired place over the recording surface of the disk while keeping itself afloat from the recording surface of the disk by a predetermined distance.

A small-sized disk drive is used in a portable electronic system, such as a personal digital assistant (PDA), a camcorder, or an MP3 player. The small-sized disk drive may be classified as either an insertable/separable type disk drive or an embedded type disk drive. An insertable/separable-type disk drive can be easily inserted into or easily separated from an electronic system. On the other hand, an embedded-type disk drive is fixed to an electronic system so that it can be protected by the case of the electronic system. In addition, the embedded-type disk drive has a relatively simple structure.

In general, the embedded-type disk drive is fixed to the electronic system using screws, in which case, external shocks and vibrations are directly transferred to the embedded-type disk drive through the screws. Therefore, the bearings of a spindle motor in the embedded-type disk drive may be damaged or a read/write head may collide with the surface of a disk.

In order to solve the above problems, a variety of vibration attenuators have been developed and one of them is illustrated in FIG. 1.

Referring to FIG. 1, a disk drive 10 includes a disk, a spindle motor, which rotates the disk, a read/write head, and an actuator, which places the read/write head over any desired portion on the disk. The disk, the spindle motor, the read/write head, and the actuator are enclosed by a base 11 and a cover 12. A damper 13 is formed at each corner of the base 11 so that external shocks or vibrations can be attenuated. A screw hole 14 is formed in the damper 13. The disk drive 10 can be installed in an electronic system by inserting screws 15 into screw holes 14 and tightening the screws 15.

As described above, the effects of external shocks or vibrations on the disk drive 10 can be attenuated to some extent by the damper 13. However, the disk drive 10 can never be free from external shocks or vibrations so long as it is fixed to the electronic system using the screws 15. In addition, since the disk drive 10 has a very small size, the screws 15 are also designed to be very small. However, small-sized screws are generally very expensive and thus, manufacturing costs of the disk drive 10 will increase. Moreover, it takes a considerable amount of time to fix the disk drive 10 to the electronic system by tightening a plurality of screws 15.

A gap between the base 11 and the cover 12 is hermetically sealed so that the disk, the spindle motor, the read/write head, and the actuator can be protected. More specifically, the gap between the base 11 and the cover 12 is hermetically sealed by installing a gasket between the base 11 and the cover 12 and screwing the gasket using three to five screws 16 or by taping the gap between the base 11 and the cover 12.

As described above, different elements of the disk drive 10 are used for installing the disk drive 10 in the electronic device, attenuating external vibrations, and hermetically sealing the gap between the base 11 and the cover 12 and thus, unit costs of production and assembly increase.

SUMMARY OF THE INVENTION

An apparatus consistent with present invention provides a mounting pad for a disk drive that is capable of installing the disk drive in an electronic system without using screws, attenuating external vibrations, and sealing the disk drive.

According to an aspect of the present invention, there is provided a mounting pad for a disk drive, which is interposed between a disk drive and an electronic system so as to install the disk drive in the electronic system. The mounting pad includes a sealing layer, which is formed on one surface of the disk drive so that any gap between a base and a cover of the disk drive can be sealed; an adhesive layer, which is formed on a surface of the electronic system facing the disk drive; and a vibration attenuation layer, which is interposed between the sealing layer and the adhesive layer to attenuate physical shocks or vibrations applied to the disk drive from the outside.

The vibration attenuation layer may be formed of a viscoelastic material.

The vibration attenuation layer may comprise a plurality of viscoelastic materials with different rigidness levels.

The vibration attenuation layer may comprise a first viscoelastic material layer and a second viscoelastic material layer with the first viscoelastic material layer being more rigid than the second viscoelastic material layer.

The first viscoelastic material layer may be disposed closer to the sealing layer than the second viscoelastic material layer, and the second viscoelastic material layer may be disposed closer to the adhesive layer than the first viscoelastic material layer.

The sealing layer may comprise a metal layer and adhesives spread on either surface of the metal layer.

The metal layer may be an aluminum layer.

The adhesive layer may be an adhesive spread on the surface of the vibration attenuation layer to a predetermined thickness.

The adhesive layer may be a double-sided adhesive tape.

The mounting pad may be a rectangular frame bonded to the disk drive along its boundaries with a predetermined width.

The mounting pad may be a rectangular plate bonded to the disk drive on its entire surface.

According to the present invention, it is possible to install a disk drive in an electronic system without using screws, attenuate external vibrations, and seal the disk drive.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
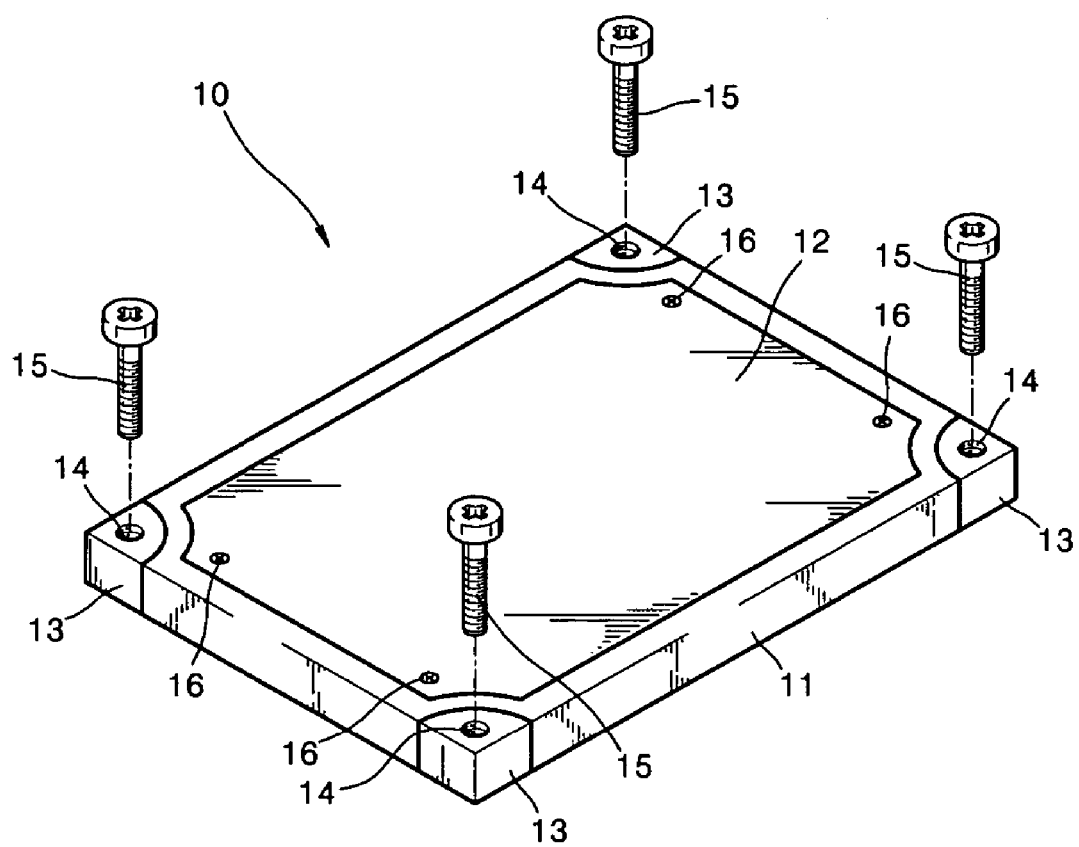
FIG. 1 is a perspective view of a conventional embedded-type disk drive.

The present invention will be described more fully with reference to the accompanying drawings, in which illustrative, non-limiting embodiments of the invention are shown. In the drawings, like reference numerals refer to like elements throughout.

Figure 2:
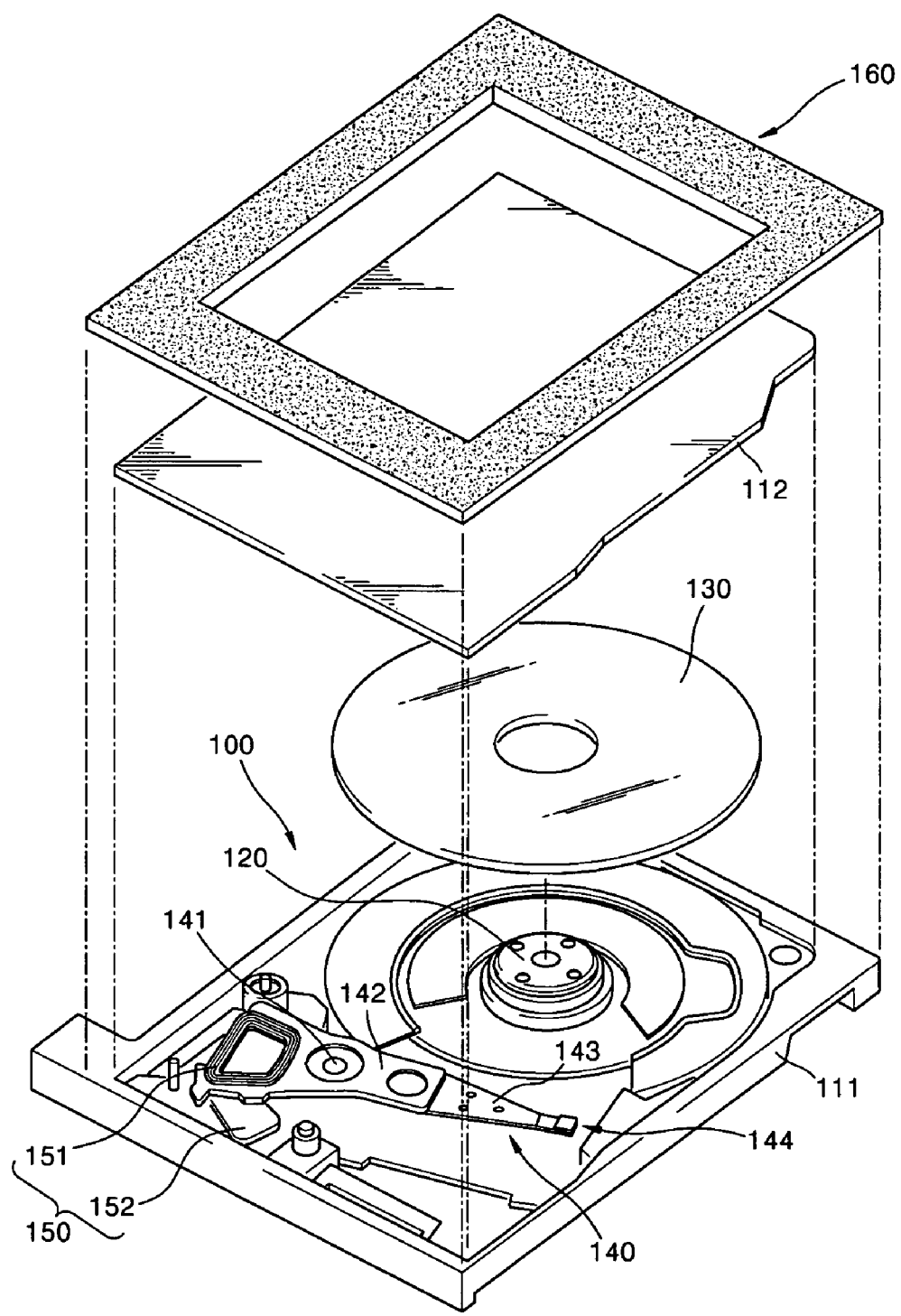
FIG. 2 is an exploded perspective view of a disk drive, to which a mounting pad according to an embodiment of the present invention is attached.
Figure 3:
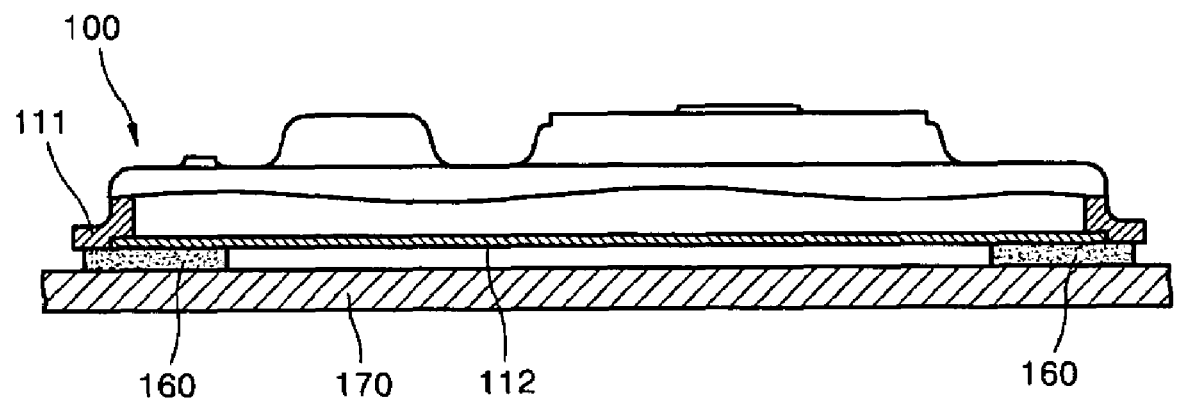
FIG. 3 is a side view of the disk drive of FIG. 2 installed in an electronic system by using the mounting pad of FIG. 2.

FIG. 2 is an exploded perspective view of a disk drive 100, to which a mounting pad 160 according to an embodiment of the present invention is attached. FIG. 3 is a side view of the disk drive 100 installed in an electronic system using the mounting pad 160. Referring to FIGS. 2 and 3, a disk drive 100 includes a base 111, a cover 112, a spindle motor 120, which rotates a disk 130, and an actuator 140, which moves a read/write head 144 to a desired place over the disk 130. The cover 112 is coupled on the base 111 so that it can protect the disk 130 and the actuator 140. The base 111 and the cover 112 are generally formed of aluminium.

The actuator 140 includes an actuator arm 142, which is coupled with an actuator pivot 141, installed on the base 111 of the disk drive 100 so that it can rotate. A suspension 143 is installed at one end of the actuator arm 142 and supports the read/write head 144 so that the read/write head 144 can be elastically biased over a surface of the disk 130. The actuator 140 further includes a voice coil motor (VCM) 150, which rotates the actuator arm 142. The VCM 150 includes a VCM coil 151, which is coupled to the other end of the actuator arm 142, and a magnet 152, which is installed on the base 111 to face the VCM coil 151. The VCM 150, which is controlled by a servo control system, rotates the actuator arm 142 in a specific direction using interactions between a current input into the VCM coil 151 and a magnetic field formed by the magnet 152 according to Flemming's Left Hand rule. In other words, when the disk drive 100 is turned on such that the disk 130 starts rotating, the VCM 150 places the read/write head 144 over a recording surface of the disk 130 by rotating the actuator arm 142 counterclockwise. On the other hand, when the disk drive 100 is turned off such that the disk 130 stops rotating, the VCM 150 removes the read/write head 144 from the disk 130 by rotating the actuator arm 142 clockwise.

The disk drive 100 can be installed in an electronic system, such as a PDA, a camcorder, or an MP3 player. In the present invention, the disk drive 100 is installed in an electronic system using the mounting pad 160, which is interposed between the disk drive 100 and the electronic system. Specifically, the mounting pad 160 is interposed between the disk drive 100 and a printed circuit board 170 of the electronic system. In other words, one surface of the mounting pad 160 is bonded to the disk drive 100 while the other surface of the mounting pad 160 is bonded to the printed circuit board 170. Therefore, in the present invention, unlike in the prior art, it is possible to install the disk drive 100 in the electronic system without using screws.

The mounting pad 160 may be formed as a rectangular frame bonded to the disk drive 100 along its boundaries with a predetermined width, as shown in FIG. 2, or as a rectangular plate bonded to the disk drive 100 on its entire surface. However, when the mounting pad 160 is formed as a rectangular frame, the manufacturing costs of the mounting pad 160 are reduced because the frame area is smaller than that of a rectangular plate.

Figure 4:
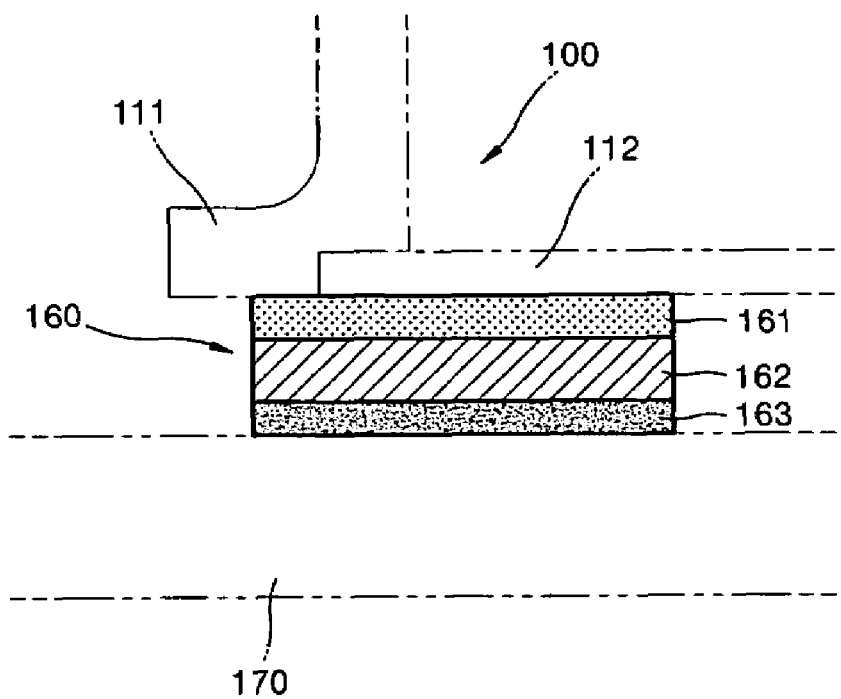
FIG. 4 is a cross-sectional view of a mounting pad for a disk drive, according to a first embodiment of the present invention.

FIG. 4 is a cross-sectional view of the mounting pad 160. Referring to FIG. 4, the mounting pad 160 comprises a sealing layer 161, a vibration attenuation layer 162, and an adhesive layer 163.

The sealing layer 161, which is bonded to a surface of the disk drive 100, seals any gap between the base 111 and the cover 112. In other words, the sealing layer 161 not only adheres the mounting pad 160 to the surface of the disk drive 100 but also seals the disk drive 100. The sealing layer 161 may be a liquid-type or a paste-type adhesive or a double-sided adhesive tape.

The adhesive layer 163 is adhered to a surface of the electronic system facing the disk drive 100 or, more particularly, to a surface of the printed circuit board 170 facing the disk drive 100. The adhesive layer 163 may be a liquid-type or a paste-type adhesive spread on the surface of the vibration attenuation layer 162. Alternatively, the adhesive layer 163 could be a double-sided adhesive tape.

The sealing layer 161 and the adhesive layer 163 are designed to have adhesiveness and heat resistance so that they remain firmly attached to the disk drive 100 or the printed circuit board 170 even when tensile stresses, physical shocks, vibrations, or temperature variations are applied thereto. In addition, the sealing layer 161 and the adhesive layer 163 are preferably, but not necessarily, formed to be as small and as thin as possible while still maintaining a desired adhesive force. Thus, the manufacturing costs of the mounting pad 160 can be reduced.

The vibration attenuation layer 162, which is interposed between the sealing layer 161 and the adhesive layer 163, may be formed of a viscoelastic material, such as rubber or an engineering plastic, having a predetermined elasticity and flexibility so that it can absorb physical shocks and/or vibrations. Therefore, the vibration attenuation layer 162 absorbs and attenuates external shocks and/or vibrations transferred to the disk drive 100 from the outside via the printed circuit board 170.

The disk drive 100 may experience external shocks whether or not the disk drive 100 is operating. For example, the disk drive 100 may experience external shocks via the suspension 143 as the actuator arm 142 is placed over the disk 130 during operation (while the disk is rotating). In this case, the external shocks may cause the read/write head 144 loaded with the suspension 143 to collide with the surface of the disk 130 and thus, the surface of the disk 130 may become scratched. On the other hand, the disk drive 100 may experience external shocks when the disk drive 100 is not operating. In this case, a bearing of the spindle motor 120 is most likely to be damaged by the external shocks. Therefore, the mounting pad 160 is designed to protect the bearings of the spindle motor 120 to industry standards. In the bearing manufacturing industry, a half sine wave signal generated at regular intervals of, for example, 1 msec with an amplitude of, for example, 1500 G is generally considered an allowable benchmark for an acceleration signal input into the bearing in a perpendicular direction with respect to the axis of the bearing.

The design of the mounting pad 160 is determined as follows. An impulse value of a bearing of the spindle motor 120 is obtained by performing a shock test on a disk drive, in which the mounting pad is yet to be installed. First, a type and shape of viscoelastic material of the mounting pad 160 are determined and then, a drop/collision analysis is carried out. Thereafter, acceleration waveform information, the maximum peak and contact duration of the bearing, which are obtained as results of the drop/collision analysis, are compared with allowable waveform information, an allowable maximum peak, and allowable contact duration of the bearing. If the maximum peak of the calculated acceleration signal exceeds the allowable maximum peak, the bearing may be damaged. Thus, the mounting pad 160 is designed using a viscoelastic material with a shape such that the maximum peak of the calculated accelerated signal is less than the allowable maximum peak.

Figure 7:
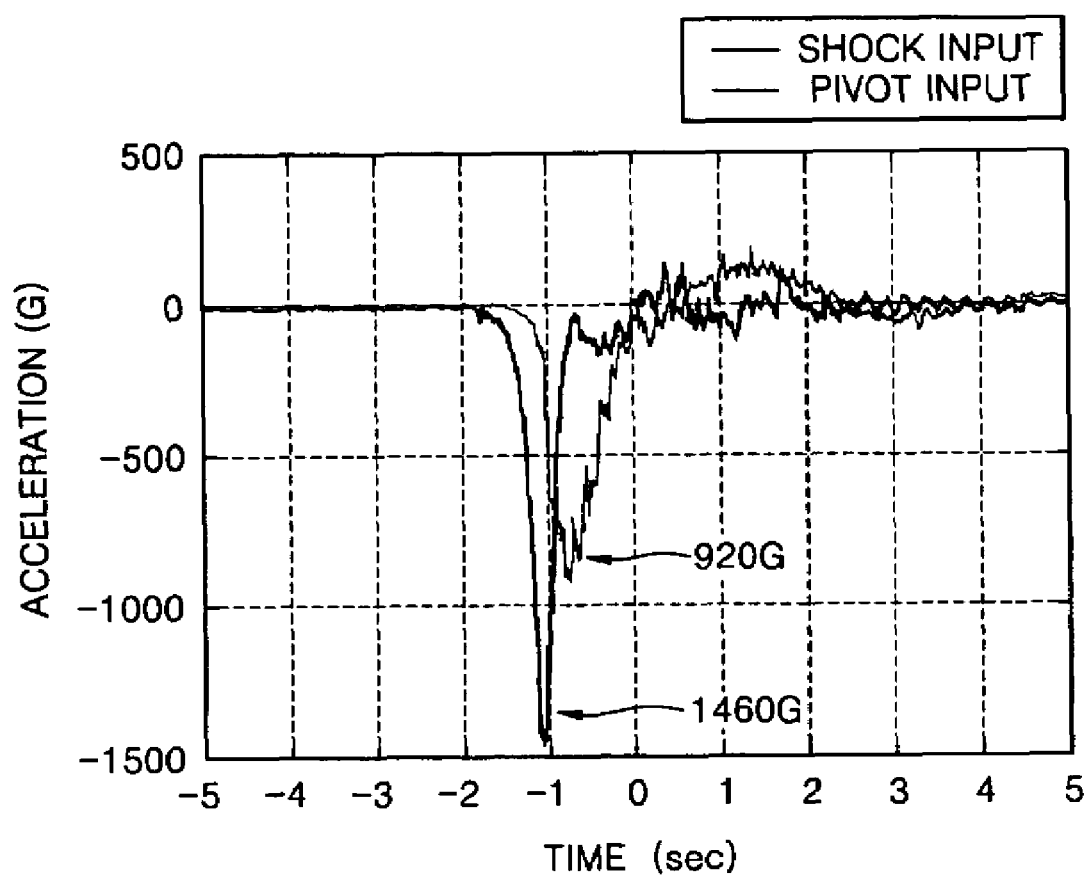
FIG. 7 is a graph showing results of testing shock resistance of a mounting pad for a disk drive according to an embodiment of the present invention.

FIG. 7 is a graph illustrating results of testing shock resistance of a mounting pad according to an embodiment of the present invention. In the shock-resistance test, a rubber pad with a thickness of 4 mm was used as a mounting pad, and a double-sided adhesive tape was used for the adhesive and sealing layers. A shock input with an amplitude of 1460 G and a duration of 1 ms was applied to an electronic system with a disk drive installed therein and then, the pivot input to the disk drive was measured. Referring to FIG. 7, the pivot input to the disk drive for a shock input of 1640 G is about 920 G, which translates into a 40% attenuation of the shock applied to the disk drive. Therefore, the mounting pad can protect a bearing of a spindle motor, a read/write head, and a disk inside the disk drive from external shocks and/or vibrations.

As described above, the mounting pad according to the present invention can install a disk drive in an electronic system, attenuate external shocks and/or vibrations applied to the disk drive, and seal the disk drive. Therefore, there is no need to use small screws or sealing gaskets. Thus, less money and time are needed to manufacture the disk drive. In addition, the general performance of the disk drive can be improved because external shocks and/or vibrations launched upon the disk drive are attenuated considerably by the mounting pad.

Figure 5:
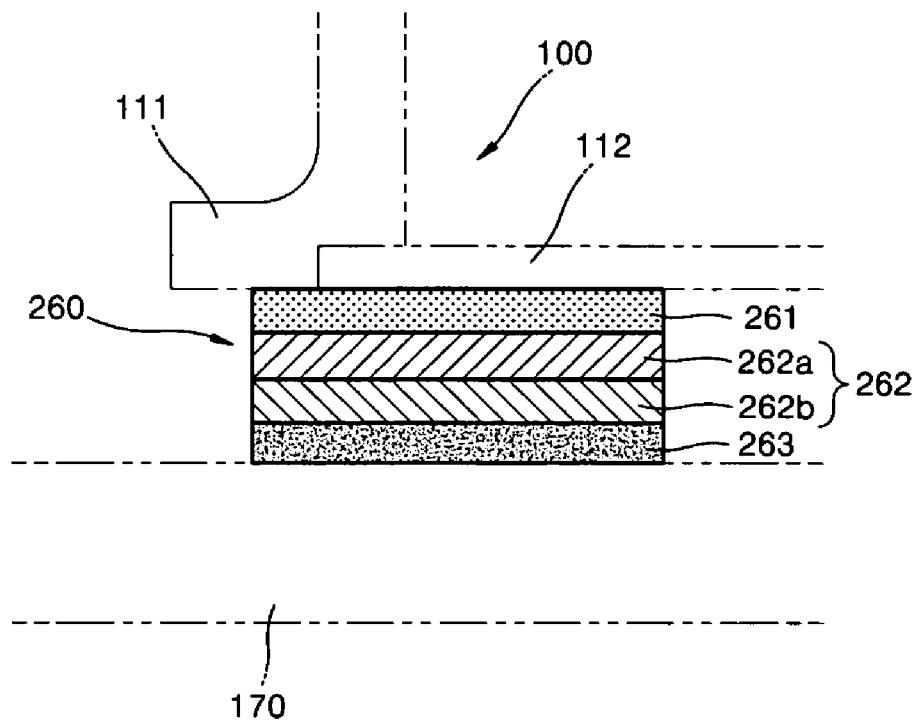
FIG. 5 is a cross-sectional view of a mounting pad for a disk drive, according to a second embodiment of the present invention.
Figure 6:
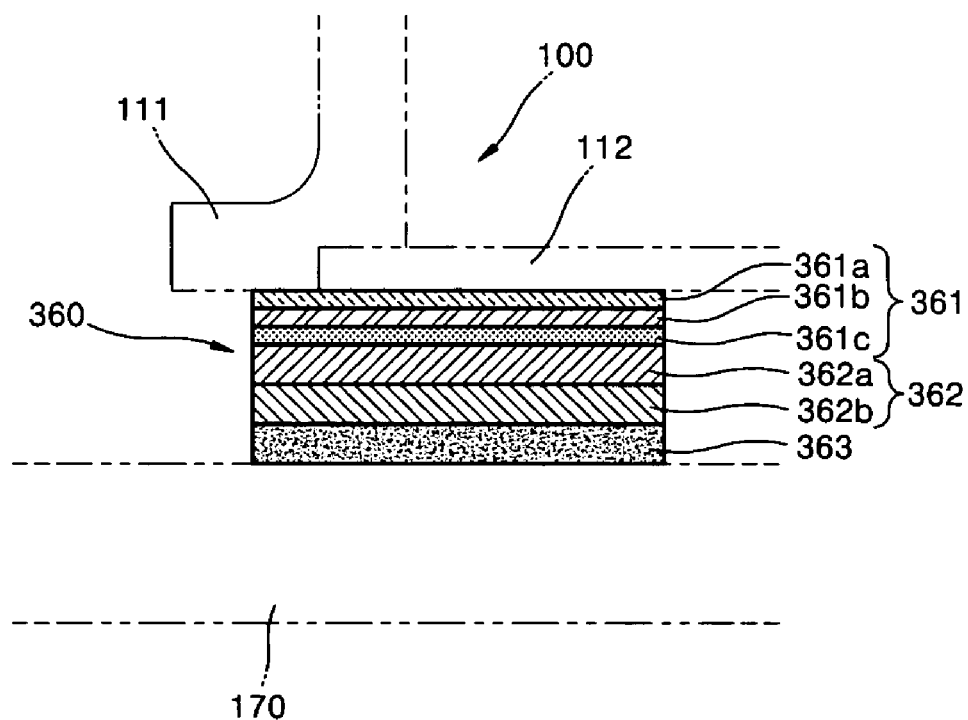
FIG. 6 is a cross-sectional view of a mounting pad for a disk drive, according to a third embodiment of the present invention.

FIGS. 5 and 6 illustrate mounting pads 260 and 360, respectively, according to the second and third embodiments of the present invention, respectively. Referring to FIG. 5, the mounting pad 260 has a stacked structure comprising a sealing layer 261, a vibration attenuation layer 262, and an adhesive layer 263. In the present embodiment, however, the vibration attenuation layer 262 comprises a plurality of viscoelastic materials with different rigidness levels.

More specifically, the vibration attenuation layer 262 may comprise two layers, i.e., a first viscoelastic material layer 262a and a second viscoelastic material layer 262b. The first viscoelastic material layer 262a may be more rigid than the second viscoelastic material 262b. For example, the first viscoelastic material layer 262a may be formed of an engineering plastic, which can bear a pressure of about $10^8$–$10^9$ Pa, and the second viscoelastic material layer 262b may be formed of a rubber, which can bear a pressure of about $10^2$–$10^3$ Pa. The first viscoelastic material layer 262a may be disposed closer to the sealing layer 261 than the second viscoelastic material layer 262b, and the second viscoelastic material layer 262b may be disposed closer to the adhesive layer 263 than the first viscoelastic material layer 262a.

The second viscoelastic material layer 262b, which is less rigid than the first viscoelastic material layer 262a, absorbs and attenuates, as much as possible, shocks and/or vibrations applied to the disk drive 100 from the outside, and the first viscoelastic material layer 262a prevents the mounting pad 260 from being excessively deformed due to the external shocks and/or vibrations. Therefore, the vibration attenuation layer 262 can sufficiently attenuate the external shocks and/or vibrations and can prevent the mounting pad 260 from being torn or detached from the disk drive 100 or from the printed circuit board 170.

The vibration attenuation characteristics and rigidness of the mounting pad 260 can be more easily controlled by appropriately adjusting the thickness and rigidness of each of the first and second viscoelastic material layers 262a and 262b.

The sealing layer 261 and the adhesive layer 263 are the same as their respective counterparts in the first embodiment of the present invention and thus, their descriptions will not be repeated again.

Referring to FIG. 6, the mounting pad 360 has a stacked structure comprising a sealing layer 361, a vibration attenuation layer 362, and an adhesive layer 363. In the present embodiment, however, the sealing layer 361 comprises a metal layer 361b and adhesives 361a and 361c, which are spread on either side of the metal layer 361b.

More specifically, the metal layer 361 may be formed of an aluminium layer, and the adhesives 361a and 361c may be a liquid-type or a paste-type adhesive or a double-sided adhesive tape. When an aluminium layer is used as the metal layer 361b, a typical aluminium tape can be used as the sealing layer 361.

The metal layer 361b prevents the sealing layer 361 from being excessively deformed or being torn due to strong physical shocks applied to the disk drive 100 from the outside. The metal layer 361b blocks electromagnetic waves from being transmitted into the disk drive 100 from the outside (e.g., from the printed circuit board 170) through a gap between the base 111 and the cover 112, thus, preventing noise caused by the electromagnetic waves. Accordingly, the reliability of the read/write head 144 can be enhanced.

The vibration attenuation layer 362 may comprise two layers, i.e., a first viscoelastic material layer 362a and a second viscoelastic material layer 362b. The first viscoelastic material layer 362a may be more rigid than the second viscoelastic material 362b.

The first and second viscoelastic material layers 362a and 362b and the adhesive layer 363 are the same as their respective counterparts in the second embodiment of the present invention and thus, their descriptions will not be repeated again.

As described above, in the present invention, a mounting pad for a disk drive has a stacked structure comprising a sealing layer, a vibration attenuation layer, and an adhesive layer. Therefore, it is possible to install the disk drive in an electronic system more firmly, attenuate physical shocks and vibrations applied to the disk drive from the outside, and seal a gap between a base and a cover of the disk drive. Therefore, it takes less money and time to manufacture the disk drive and the general performance of the disk drive is enhanced.

In addition, since a sealing layer of the mounting pad may include an aluminium layer, it is possible to prevent the sealing layer from being damaged due to intense physical shocks and to prevent noise from being generated due to electromagnetic waves by blocking the electromagnetic waves from being transmitted to the inside of the disk drive.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the mounting pad according to the present invention could be applied to various types of disk drives, such as disk drives including an optical disk drive, other than the disk drive set forth herein. In addition, each layer of the mounting pad could be formed of a different material from those set forth herein.

What is claimed is:

1. A mounting pad for a disk drive, which is interposed between a disk drive and an electronic system so as to install the disk drive in the electronic system, the mounting pad comprising:
    a sealing layer, which is disposed on one outside surface of the disk drive so that a gap between a base and a cover of the disk drive can be sealed;
    an adhesive layer, which is disposed on a surface of the electronic system facing the disk drive; and
    a vibration attenuation layer, which is interposed between the sealing layer and the adhesive layer to attenuate physical shock or vibration applied to the disk drive from the outside;
    wherein the sealing layer is the only manner in which the base and the cover are held together.

2. The mounting pad of claim 1, wherein the vibration attenuation layer is formed of a viscoelastic material.

3. The mounting pad of claim 2, wherein the vibration attenuation layer comprises a plurality of viscoelastic materials with different rigidness levels.

4. The mounting pad of claim 3, wherein the vibration attenuation layer comprises a first viscoelastic material layer and a second viscoelastic material layer, and
    wherein the first viscoelastic material layer is more rigid than the second viscoelastic material layer.

5. The mounting pad of claim 4, wherein the first viscoelastic material layer is disposed closer to the sealing layer than the second viscoelastic material layer, and the second viscoelastic material layer is disposed closer to the adhesive layer than the first viscoelastic material layer.

6. The mounting pad of claim 1, wherein the sealing layer comprises a metal layer and adhesives spread on either surface of the metal layer.

7. The mounting pad of claim 6, wherein the metal layer is an aluminum layer.

8. The mounting pad of claim 1, wherein the adhesive layer is an adhesive spread on the surface of the vibration attenuation layer to a predetermined thickness.

9. The mounting pad of claim 1, wherein the adhesive layer is a double-sided adhesive tape.

10. The mounting pad of claim 1, wherein the mounting pad is a rectangular frame bonded to the disk drive along its boundaries with a predetermined width.

11. The mounting pad of claim 1, wherein the mounting pad is a rectangular plate bonded to the disk drive on its entire surface.

12. The mounting pad of claim 1, wherein the sealing layer is an adhesive.

13. The mounting pad of claim 12, wherein the adhesive is a double-sided adhesive tape.

* * * * *